US010228303B2

(12) United States Patent
Lazic et al.

(10) Patent No.: US 10,228,303 B2
(45) Date of Patent: Mar. 12, 2019

(54) FLEXIBLE AUTOMATION CELL FOR PERFORMING SECONDARY OPERATIONS IN CONCERT WITH A MACHINING CENTER AND ROLL CHECK OPERATIONS

(71) Applicant: Automation Controls & Engineering, LLC, Dexter, MI (US)

(72) Inventors: Predrag Lazic, Dexter, MI (US); Chris Mackey, Dexter, MI (US); Steve Moore, Dexter, MI (US)

(73) Assignee: Automation Controls & Engineering, LLC, Dexter, MI (US)

( * ) Notice: Subject to any disclaimer, the term of this patent is extended or adjusted under 35 U.S.C. 154(b) by 112 days.

(21) Appl. No.: 15/592,306

(22) Filed: May 11, 2017

(65) Prior Publication Data

US 2017/0254724 A1    Sep. 7, 2017

Related U.S. Application Data

(63) Continuation-in-part of application No. 15/412,621, filed on Jan. 23, 2017, which is a continuation of
(Continued)

(51) Int. Cl.
| | |
|---|---|
| *G01B 7/28* | (2006.01) |
| *G01M 13/021* | (2019.01) |
| *B23F 23/12* | (2006.01) |
| *B23F 23/02* | (2006.01) |
| *B25J 15/00* | (2006.01) |
| *B23Q 7/04* | (2006.01) |
| *B23Q 17/20* | (2006.01) |
| *B25J 21/00* | (2006.01) |
| *G01B 7/00* | (2006.01) |
| *B23Q 17/00* | (2006.01) |

(52) U.S. Cl.
CPC ........... *G01M 13/021* (2013.01); *B23F 23/02* (2013.01); *B23F 23/1218* (2013.01); *B23Q 7/04* (2013.01); *B23Q 7/048* (2013.01); *B23Q 17/20* (2013.01); *B25J 15/0052* (2013.01); *B25J 21/00* (2013.01); *G01B 7/003* (2013.01); *G01B 7/282* (2013.01); *G01B 7/283* (2013.01); *B23Q 2017/001* (2013.01)

(58) Field of Classification Search
CPC ....... G01M 13/021; B23F 23/02; B25J 21/00; B23Q 7/04; G01B 7/283
USPC .................................. 33/1 B, 501.7, 501.19
See application file for complete search history.

(56) References Cited

U.S. PATENT DOCUMENTS

| | | |
|---|---|---|
| 4,137,642 A | 2/1979 | Halvarsson |
| 4,322,889 A | 4/1982 | Guenter |
| (Continued) | | |

*Primary Examiner* — G. Bradley Bennett
(74) *Attorney, Agent, or Firm* — Dinsmore & Shohl LLP

(57) ABSTRACT

An automation cell for performing a plurality of secondary operations on manufactured parts is for use with a manufacturing machine operable to perform primary manufacturing of the parts. The automation cell includes a cell housing, a robot with a gripper mechanism capable of loading and unloading a part between the manufacturing machine and the automation cell, a gauging station being a secondary operation device and operable to gauge a parameter of a manufactured part, a marking device for marking the manufactured part, and a vision system for verifying the marking of the manufactured part.

11 Claims, 16 Drawing Sheets

Related U.S. Application Data application No. 14/673,932, filed on Mar. 31, 2015, now Pat. No. 9,551,628.

(60) Provisional application No. 61/972,897, filed on Mar. 31, 2014.

(56) References Cited

U.S. PATENT DOCUMENTS

| | | |
|---|---|---|
| 4,519,241 A | 5/1985 | Hofler |
| 5,016,471 A | 5/1991 | Och |
| 5,667,351 A | 9/1997 | Tokairin et al. |
| 9,671,310 B2 | 6/2017 | Lazic et al. |
| 2004/0098162 A1 | 5/2004 | McGuire |
| 2006/0254055 A1 | 11/2006 | Sabourin |
| 2009/0223592 A1* | 9/2009 | Procyshyn ............... B25J 21/00 141/2 |
| 2009/0249633 A1 | 10/2009 | Patrick et al. |
| 2011/0232116 A1 | 9/2011 | Nagata |
| 2015/0066390 A1 | 3/2015 | Chen et al. |
| 2015/0193919 A1 | 7/2015 | Nissen et al. |
| 2015/0338309 A1 | 11/2015 | Lazic et al. |
| 2016/0214805 A1 | 7/2016 | Ebihara et al. |
| 2017/0122837 A1* | 5/2017 | Mtauweg ............ G01M 13/021 |
| 2017/0356824 A1* | 12/2017 | Zhang ................ G01N 21/9515 |
| 2018/0117767 A1 | 5/2018 | Yokota et al. |
| 2018/0126567 A1* | 5/2018 | Morimura ................ B08B 3/02 |
| 2018/0154522 A1* | 6/2018 | Yokota .................... B23P 19/04 |
| 2018/0210424 A1* | 7/2018 | Besik .................. B23K 9/0953 |

* cited by examiner

FLEXIBLE AUTOMATION CELL FOR PERFORMING SECONDARY OPERATIONS IN CONCERT WITH A MACHINING CENTER AND ROLL CHECK OPERATIONS

REFERENCE TO RELATED APPLICATIONS

This application is a continuation-in-part of U.S. patent application Ser. No. 15/412,621, filed Jan. 23, 2017, which is a continuation of U.S. patent application Ser. No. 14/673,932, now U.S. Pat. No. 9,551,628, which claims priority to U.S. Provisional Application No. 61/972,897, filed Mar. 31, 2014, the entire content of all of which are incorporated herein by reference.

FIELD OF THE INVENTION

This invention relates to a flexible automation cell adapted to load blanks for production parts into an adjacent machining center for the performance of a primary operation, to unload the parts after performance of the primary operation, and to perform secondary operations, including checking the results of the primary operation on the unloaded part.

BACKGROUND OF THE INVENTION

Automated machining centers, often employing numerically controlled milling machines, lathes, or similar specialty machine tools such as gear grinding machines and the like, have come into widespread use to perform primary operations on workpieces. The parts produced by these machining centers often require secondary operations, such as the inspection of the parts for proper completion of the primary operation, cleaning the part by washing or the like, or the performance of additional machining operations. In present practice, these primarily machined parts are unloaded from the machining center and delivered to a separated machine for the performance of the necessary secondary operations. Often several secondary operations must each be performed in different machines and the part must further be transported between these machines. This multistage processing is often time consuming, requires substantial manual labor, and is wasteful of shop space.

SUMMARY OF THE INVENTION

To eliminate these inefficiencies, the present invention is directed toward an automation cell adapted to be located immediately adjacent to a machining center and incorporating robotic means for loading the machining center with blanks to be operated on by performance of one or more primary operations, and the ability to remove the primary machined parts to the automation cell for inspection and the performance of one or more secondary operations. The output of the automation cell constitutes parts which have been primarily machined, passed inspection, and had some or all of the necessary secondary operations performed in the cell. This arrangement greatly improves the speed of producing finished parts; eliminates the labor necessary to load, unload, and transport the parts between machines; and conserves shop floor space.

While a preferred embodiment of the invention employing a novel run-out roll inspection operation performed in the automation cell is disclosed, the broader aspects of the present invention are applicable to any part requiring primary operations to be performed in a machining center and secondary operations to be performed after the primary machining. The invention is not limited to the common numerically controlled milling machines or lathes but is applicable to any machining sequence amenable to a primary operation being performed in one machine and secondary operations being performed in one or more separated machines.

In the preferred embodiment of the invention the machining center constitutes a gear grinder and the associated automation cell inspects primarily machined parts that are received from the gear grinder for assurance that their run-out is within specified limits in a novel manner. The automation cell may also laser mark the parts and wash them to remove any residual materials from the primary machining operation. Unmachined blanks and the resulting primarily machined parts are transferred between the automation cell and the machining center by a robot. In the preferred embodiment of the invention the robot comprises a six axis electrically servo driven robot with high speed and precision. The robotic arm is equipped with a "dual gripper" tooling configuration that uses servo controlled gripper mechanisms to clamp and unclamp the parts. The servo controlled gripper mechanism also provides the ability to measure the part diameter to determine that the proper part style has been loaded into the machining center from the automation cell and that the part matches the current part selected for manufacturing.

The dual gripper tooling configuration allows the robot to perform a part exchange wherein, in a single cycle, the part blank is loaded from the automation cell into the machining center and a primarily machined part is removed from the machining center to the automation cell for the performance of secondary operations, preferably including inspection.

The automation cell of the preferred embodiment employs a part wash and spinoff station used to remove material fines and excess cutting fluid from the machined parts. It also incorporates a laser marking which will mark the part with an assigned 2D code or serial number that can be used for traceability of the workpiece. The cell contains a controller that can record and store data for each gear that is logged to the unique serial number.

In the preferred embodiment of the invention the parts being operated on are ground gears and the inspection performed in the automation cell constitutes a novel process for checking gear run-out from center line during meshed rotation of the machined gear against a qualified master part. Broadly, the machined production gear is loaded into a powered spindle for rotation and the master gear is supported for rotation on a slide capable of movement toward and away from the production gear along an axis which is essentially normal to the rotational axis of the production gear. The slide rotatably supports the master gear and is preferably powered pneumatically to move the master gear into meshed engagement with the rotating production gear. As the two rotate, the slide support is forced laterally to the rotational axis against the fluid driver, as a result of gear run-out from center line. This motion is sensed and a signal from the sensor is provided to a controller that will determine whether the maximum run-out value exceeds an acceptable limit. If it does exceed this limit, the gear will be tagged as a reject.

In another embodiment of the present invention, the automation cell is adapted to perform a plurality of secondary operations on a manufactured part manufactured at a machine center. The secondary operation may include but not be limited to gauging of the manufactured part. In one embodiment, the automation cell includes one or more gauging stations each operable to gauge a parameter of the manufactured part and determine if the manufactured part meets a specification.

The automation cell may include a marking device and a vision system. The marking device is used for marking the manufactured part if the part meets the specification. The mark may be a unique identification code or the like. The identification code is used for the traceability of the manufactured part.

The marking device may include but not be limited to a laser marking or dot peening device. The vision system may be, but is not limited to, a camera. The vision system is used for verifying the marking of the manufactured part by the marking device.

The automation cell includes a robotic arm with a gripper mechanism. The robot is programmed to move the manufactured part between the machine center and the automation cell. Within the automation cell, the gripper mechanism may be programmed to move the part between the plurality of gauging stations, depending on the process requirements.

The gauging station may be selected from a roll check, a vision system and other gauging checks.

The manufactured part may be selected from a machined gear, a machined shaft, a machined part and a molded part.

The marking step may be performed while the manufactured part is clamped in the gauging station or away from the gauging station, in a marking position.

The automation cell may further include an input area and an output area defined at least partially in the cell housing and a plurality of part holding trays disposed in the input and output area.

The gripper mechanism may be programmed to grip a part from one of the part holding trays in the input area using the gripper mechanism of the robot and moving it to the manufacturing machine center and to grip the manufactured part after the vision verifying step and move it to one of the part holding trays in the output area.

The automation cell may further include a second robot to share the workload in one machining cycle.

The automation cell may further include a secondary operation device other than the gauging station, the secondary operation device operable to perform a secondary operation other than gauging a parameter of the manufactured part.

BRIEF DESCRIPTION OF THE DRAWINGS

Other objectives, advantages, and applications of the present invention will be made apparent by the following detailed description of a preferred embodiment of the invention. The description makes reference to the accompanying drawings in which.

DETAILED DESCRIPTION OF THE PREFERRED EMBODIMENT

Figure 1:
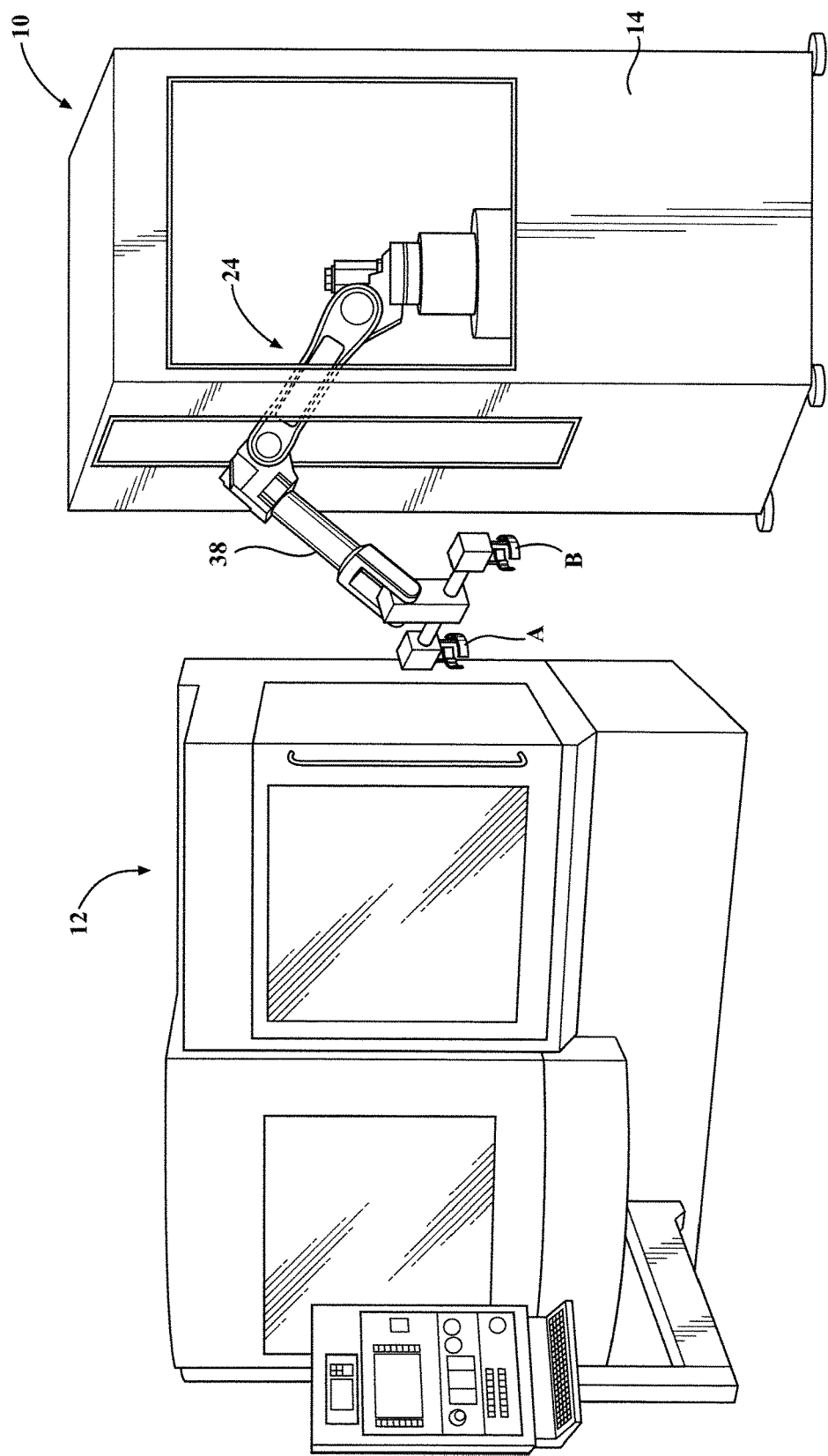
FIG. 1 is a perspective view of a commercially available gear grinding machine and an adjacent automation cell embodying the present invention.

As illustrated in FIG. 1, the automation cell 10 of the present invention coordinates and is disposed adjacent to a machining center 12 that performs primary operations on workpieces. Typical machining centers constitute numerically controlled milling machines or lathes or other specialty machines such as the gear grinder employed in the preferred embodiment of the present invention. The machining centers could constitute "tool changing" machine centers employing a variety of cutters that can be alternatively employed by the machine such as tool changing milling machines.

As has been noted, the preferred embodiment of the present invention relates, among other things, to the automation cell 10 for performing secondary operations on a gear after a gear blank has been initially ground in a modular gear grinding machine 12 such as is illustrated in FIG. 1. These commercially available machines may be equipped with one or more work spindles which may be automatically moved into an easily accessible loading and unloading position. The illustrated machine is manufactured by Reishauer.

Figure 2:
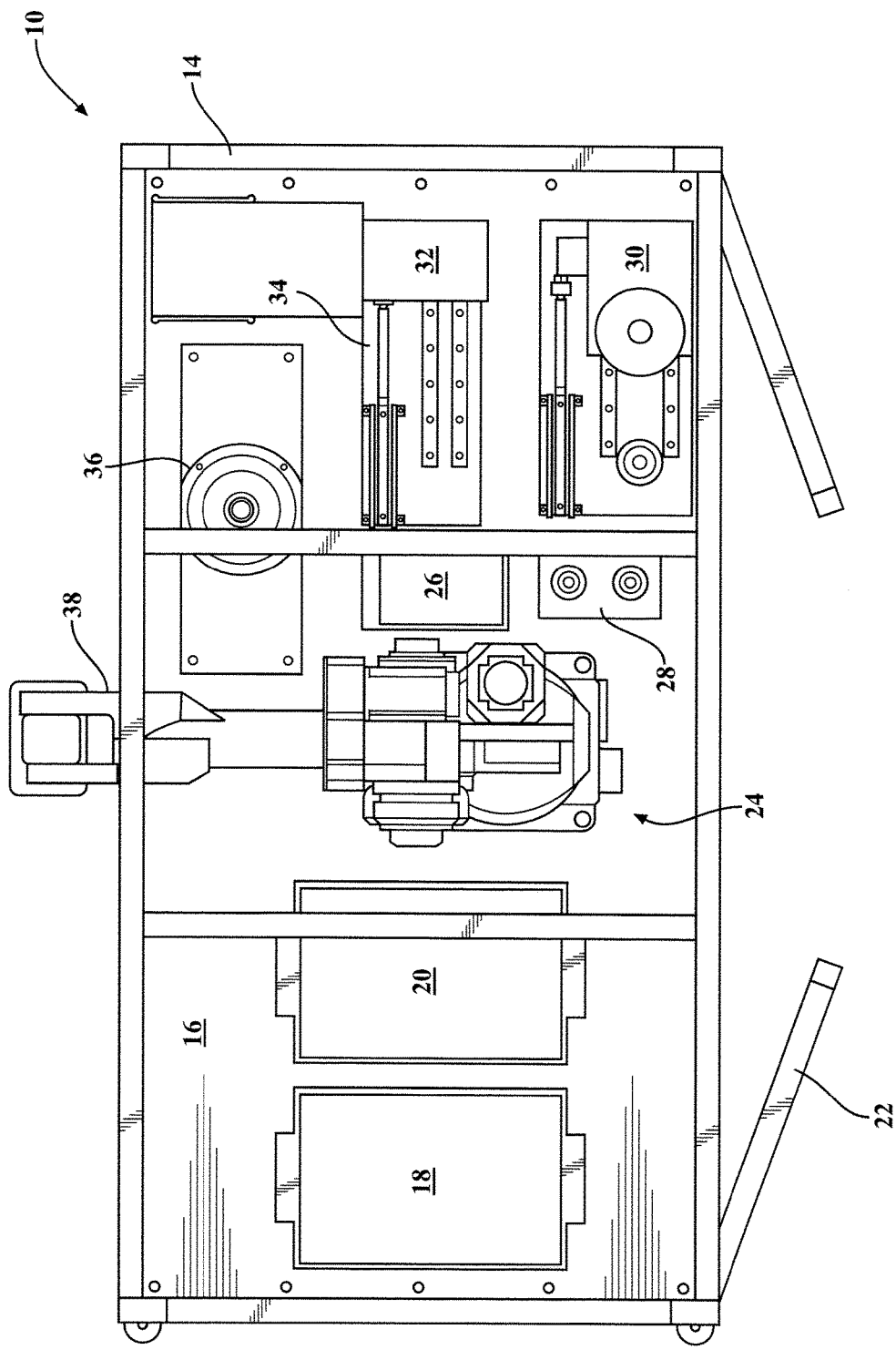
FIG. 2 is a plan view of the automation cell forming part of the present invention.
Figure 3A:
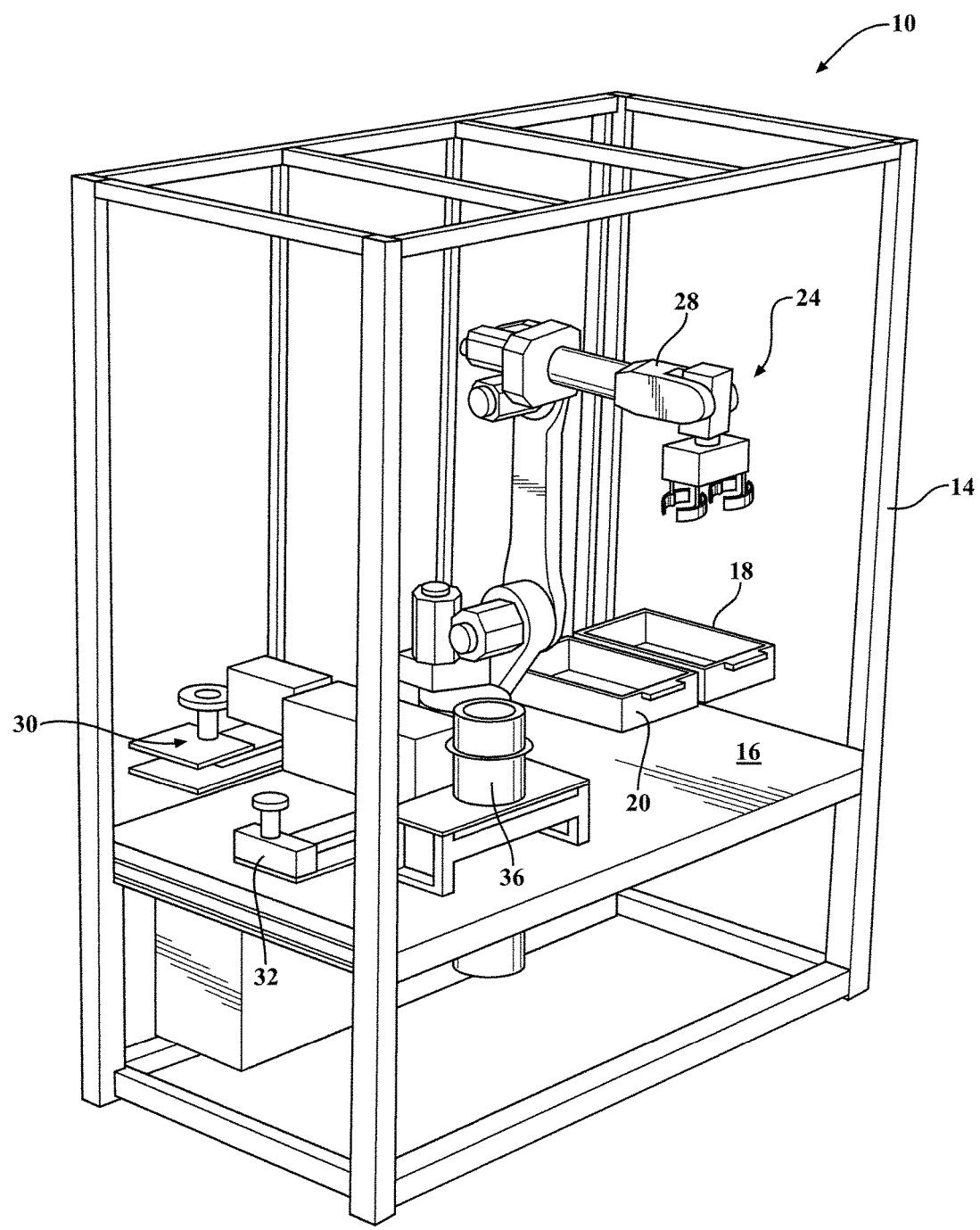
FIG. 3A is a perspective view of the preferred embodiment of the automation cell of the present invention from the upper corner of the front, with the side panels removed.
Figure 3B:
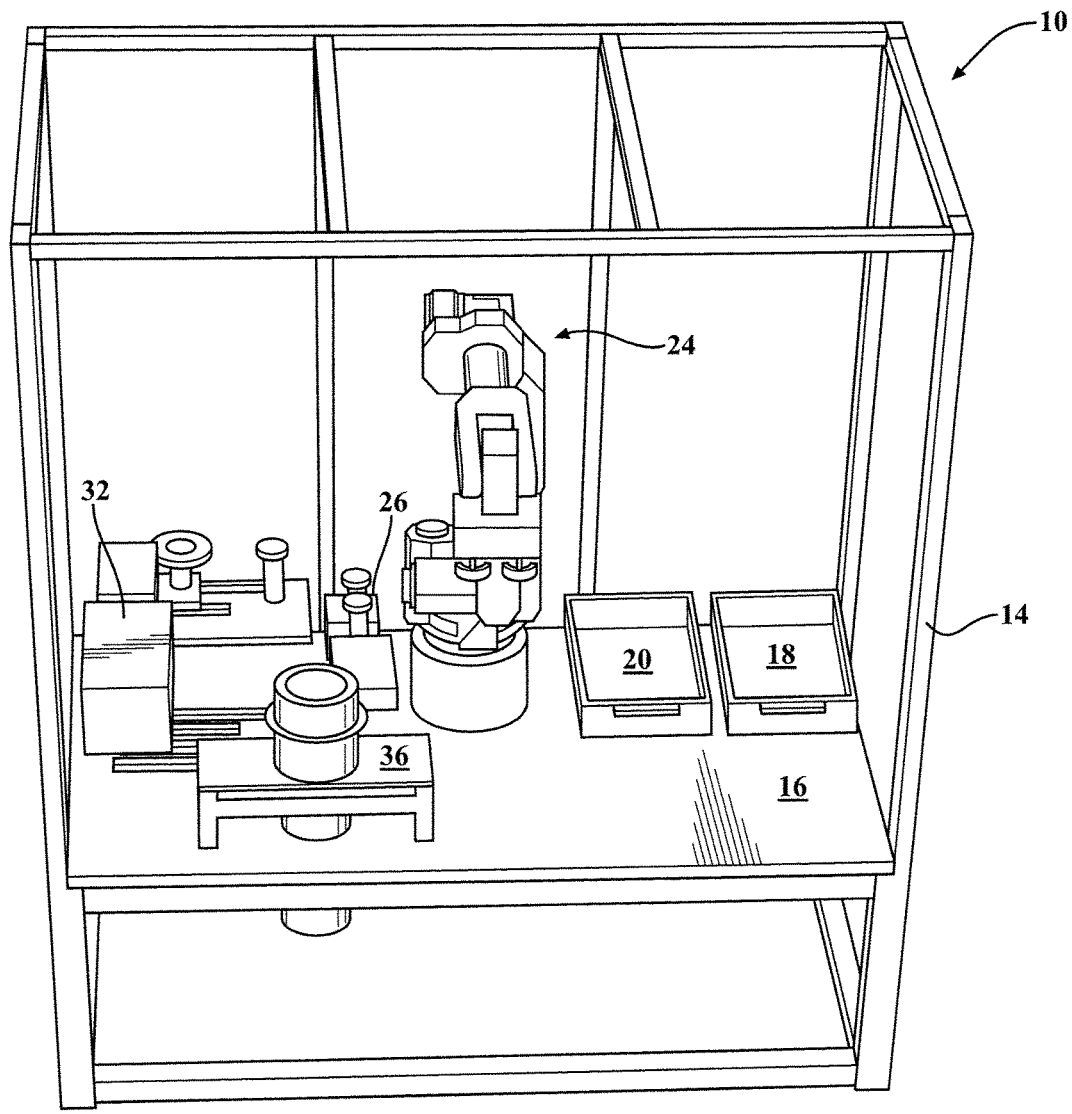
FIG. 3B is a perspective view of the automation cell from the upper rear, with the side panels removed.

The automation cell 10 is generally indicated in the plan view of FIG. 2 and in the two perspective views of FIGS. 3A and 3B. The cell is enclosed by a rectangular framework 14. The framework supports side and top panels which enclose the automation cell 10 but which are not shown in FIGS. 2, 3A, and 3B for purposes of illustration. The panels are typically formed of plastic and may be translucent.

The frame 14 supports a horizontal table 16. The table supports a pair of trays 18 and 20. The tray 18 is used to receive incoming parts, that is blanks that have not been primarily machined. These may be loaded either manually or automatically through two access doors 22 in the side panels. The tray 20 is for outgoing parts, that is parts that have been primarily machined in the machining center 12, returned to the automation cell 10, undergone the secondary operations provided by the automation cell, and passed inspection.

In its central section the table 16 supports a robot 24 which can move incoming parts from the tray 18 into the machining center 12, can retrieve the primarily machined parts, move them between the secondary operation devices supported in the automation cell 10, and place the completed parts, those which passed the inspection, in the outgoing part tray 20. Completed parts which do not pass the inspection provided by the automation cell 10 are placed by the robot 24 into a reject part bin 26.

The robot 24 is programmable and preferably constitutes a six axis of freedom robot.

The robot 24 is programmed to place certain sample parts which have been completed and passed inspection into an SPC (statistical process control) post assembly 28. For example, every fiftieth part which has passed inspection may be moved into the post 28 where it may be removed and externally inspected to ensure that the automation cell is meeting the required inspection standard.

The parts removed from the machining center 12 by the robot 24 are first loaded into a roll check assembly 30. This assembly, which will later be explained in more detail, is a novel unit for checking gear run-out from center line during rotation of the machined gear against a qualified master part. This run-out measurement is compared to a stored maximum value. The machined parts that do not meet this roll-out specification are loaded by the robot into the reject part bin 26.

The automation cell 10 also has a laser marker 32 for the completed parts. This preferably constitutes a fiber type laser used for part marking. The laser will mark a part with an assigned 2D code/serial number that can be used for traceability of the workpiece. The cell can record and store data for each gear that is logged to the unique serial number. Possible data points for collection could be: 1) manufacturing machine number; 2) manufacturing machine spindle number (in the case of multi spindle machines); 3) date and time of manufacture; 4) roll check inspection results. The laser marker 32 further comprises a shuttle used to fix the gear and transport it under the laser marker in a sealed enclosure for marking.

The automation cell 10 further comprises a part washer 36 to wash the parts and rotate them to spin off moisture and the like, used to remove material fines and excess cutting fluid from the machined parts.

Figure 8:
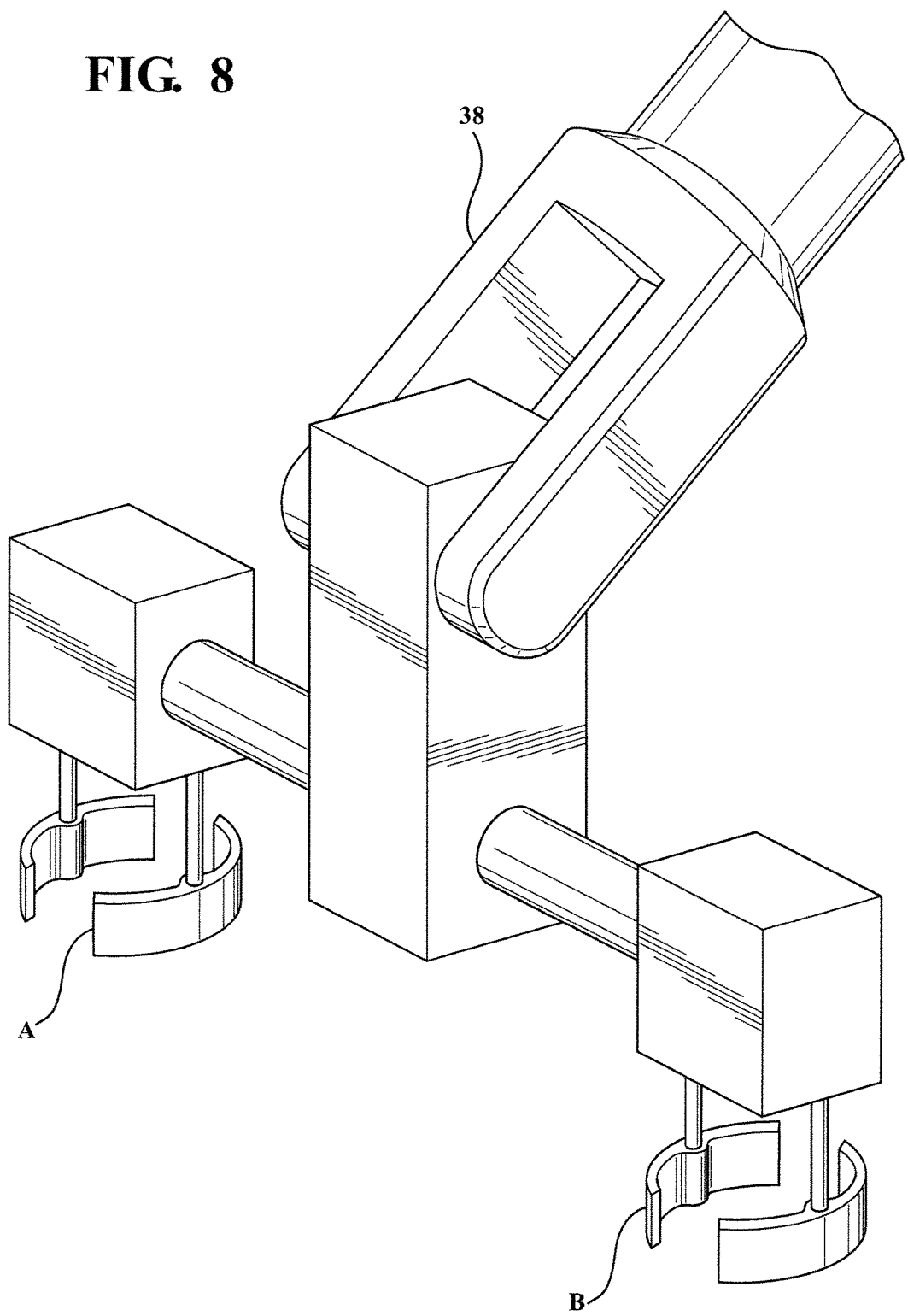
FIG. 8 is a detail view of the dual gripper mechanism support on the free end of the robotic arm forming part of the automation cell.

As has been noted, the robot 24 arm 38 has the capability of gripping two parts at a time in order to load one new part and remove one completed part from the gear grinder or other serviced machine 12. The detail of the arm end is illustrated in FIG. 8. Each of the grippers, labeled A and B, comprises a pair of concave sections facing one another, one of which can be moved toward and away from the other under suitable fluid power. The arm also includes gauging equipment which measures the closed positions of the movable gripper section against the part to provide a measurement of the part diameter and control the amount of force applied during the gripping process. The diameter measurement may be used to determine that the proper part style has been loaded in the incoming part tray, and that the part matches the current part selected for manufacturing.

A preferred embodiment of the roll check assembly 30 is illustrated in FIGS. 4-7. The roll check assembly is supported on a base plate 50. A pair of linear bearing rolls 52 extend parallel to one another on the base and support a master gear slide table 54. The master gear slide table 54 has a spindle 56 for supporting a master gear 66, extending from its upward surface. A gear for inspection 58 is supported on an ID clamp on a second spindle 60. The spindle 60 is located between the linear rolls 52. A pneumatic cylinder 64 with adjustable pressure control drives the slide table 54 toward the spindle 60 to bring the master gear 66 into mesh with the machined gear 58. In operation, the motor 70 rotates the machined gear 58 as well as the master gear 66 which is in mesh with the machined gear 58. Any deviation in roll-out from the center line in the machined gear will force the master gear slide table 54 to move away from the center line of the machined gear 58. An LVDT 70, best seen in FIG. 4, senses the position of the slide table and feeds an amplified signal in the millivolt or milliamp range to a processor that translates these signals into a linear position. These signals are stored and compared with a stored value for maximum roll-out to segregate the proper machined gears from the improper gears. By adjusting the pressure control on the cylinder 64, the slide 54 can be accurately followed by movements of the shaft of the cylinder 64.

In alternative embodiments of the invention the master gear could be powered into rotation rather than the machined gear.

The sequence of operation of the roll check device is as follows:
1. Operator installs the appropriate master gear on the spindle 56 for the selected production part.
2. Operator installs the appropriate machined gear ID clamp mandrel on the spindle 60 for the selected production part.
3. The robot 24 places a machined gear onto the driven spindle 60.
4. The driven spindle ID clamp will actuate, clamping the part on the ID (internal diameter).
5. The slide table 54 then is actuated forward by the pneumatic cylinder 64 to engage the machined gear with the master gear.
6. The machined gear then starts to rotate. During initial rotation, the LVDT 70 is monitoring the linear position of the slide table to first ensure the production and master gears have meshed. Once the mesh is realized, the production gear will now monitor the rotation to ensure 1.5 revolutions of the production piece while the LVDT is monitoring the slide table position for gear run-out.
7. Once the inspection cycle is complete, the slide table retracts back to the load/unload position and the driven spindle unclamps the ID part clamp of the production piece.
8. Now the cycle is complete and the material handling device is clear to remove the machined gear and load the next one, re-starting the cycle again at step 3.

The sequence of operation of the entire system is as follows:
1. Operator loads a full tray of "Green" part blanks in the incoming part tray 18, and an empty tray 20 at the outgoing part tray position.
2. Operator closed the access door and presses a start button.
3. The robot 24 travels to the incoming tray position and removes a green part with gripper A.
4. The robot then travels to the grinding machine and removes a finished part with gripper B, and places a green part with gripper A and moves out clear of the machine (at this point the machine starts its cycle).
5. The robot travels to the part wash position 36 and removes a finished/washed part with gripper A, and places the finished/dirty part in the washer with gripper B and moves up clear of the washer (at this point the washer starts its cycle).

6. The robot travels to the roll checker 30 and removes a full inspected part from the checker fixture with gripper B, and places the cleaned finished part in the checker fixture with gripper A and moves clear of the roll checker (at this point the roll checker starts its cycle).

7a. The robot 24 travels to the laser marker shuttle 34 and removes a marked part with gripper A, and places the inspected part in the shuttle fixture with gripper B and moves up clear of the shuttle fixture (at this point the shuttle fixture moves into the laser position for marking the part).

7b. If the inspected part does not pass the roll check, the robot will move to the reject bin and deposit the part.

8. The robot travels to the outgoing tray position 20 and places the machined, washed, inspected and laser marked part into the outgoing part tray.

9. Cycle now starts over at sequence number 3.

Figure 9:
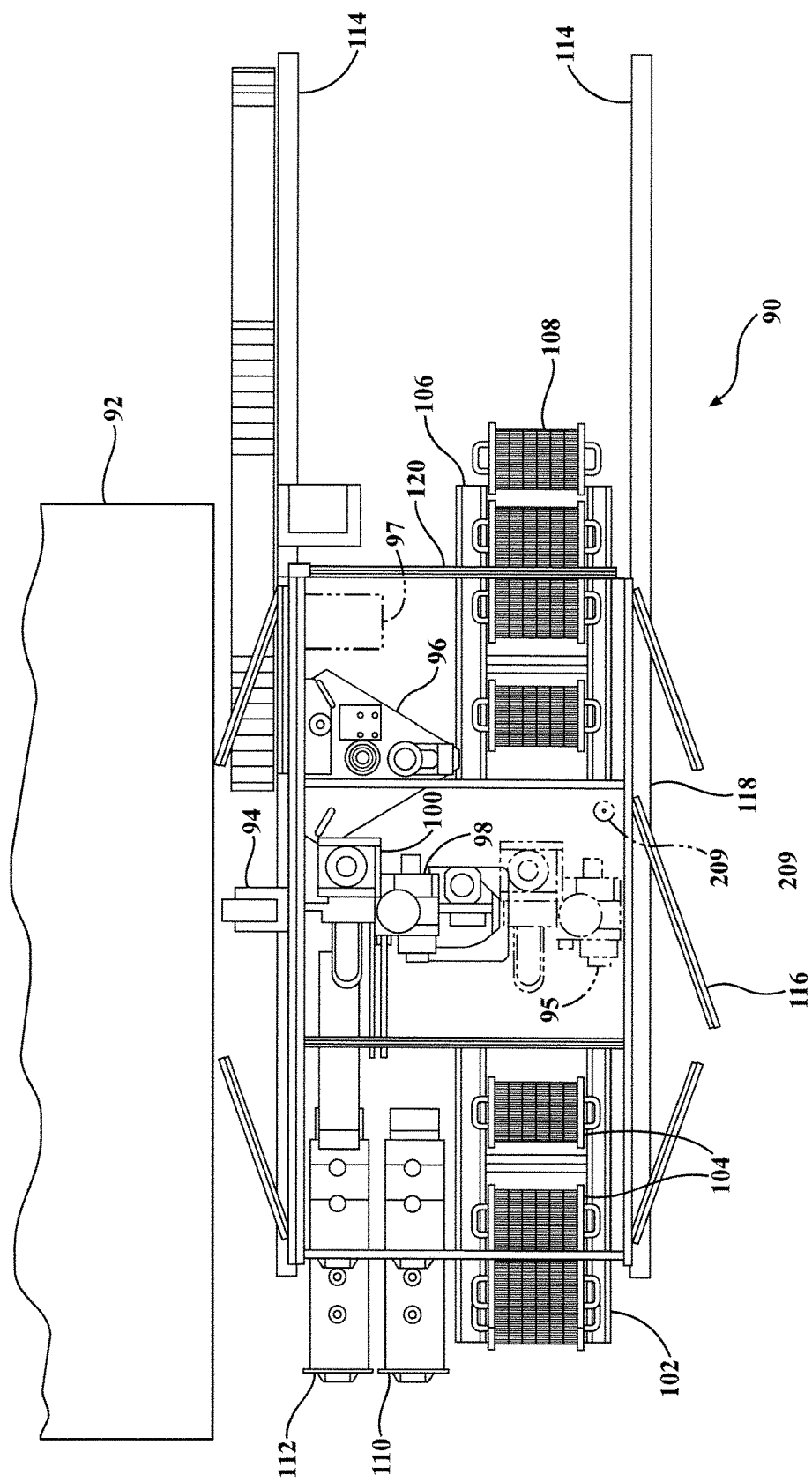
FIG. 9 is a plan view of an automation cell adjacent to a machine center in accordance with another embodiment of the present invention.
Figure 10:
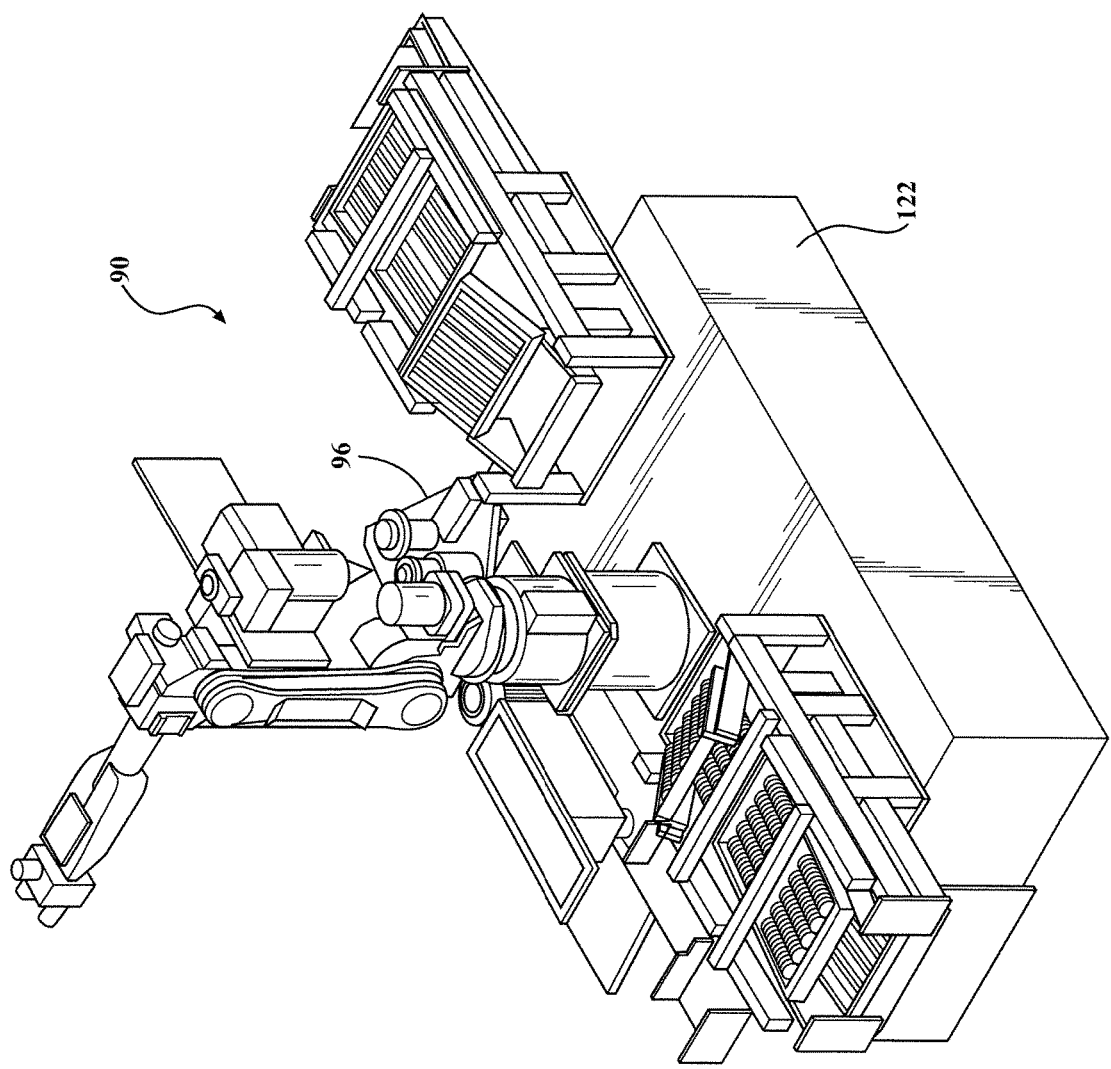
FIG. 10 is a perspective view of the automation cell without enclosing walls.

Another embodiment of an automation cell 90 in accordance with the present invention is generally illustrated in the plan view of FIG. 9 and in a perspective view of FIG. 10. The automation cell 90 is situated adjacent to a manufacturing machine center 92. Typical machining centers constitute numerically controlled milling machines or lathes or other specialty machines such as the gear grinder employed in the preferred embodiment of the present invention.

The cell is disposed on a generally rectangular foot print 118. The cell may be substantially enclosed in a rectangular barrier 120. The barrier may be forming of any suitable material, e.g., plastic, sheet metal, or woven wire mesh. Loading and unloading may be performed through access doors 116. The cell may be confined by a pair of linear tracks extending parallel to one another on the floor and supporting the automation cell 90. In another embodiment, the barrier may not be a physical barrier at all, as indicated in FIG. 10.

The automation cell 90 includes a horizontal table 122. In the center area of the table 122 supports a robot 94, a secondary operation assembly 96, a marking device 98 and a vision system 100. The table 122 also supports an input area 102 having a plurality of trays 104 and an output area 106 having a plurality of trays 108. The table further supports a reject drawer 110 and a Statistical Process Control (SPC) drawer 112.

The robot can load green parts from the incoming trays 104 and move the green parts from the trays into the manufacturing machine center 92. The robot can further retrieve the primarily machined parts and move them onto the secondary operation assembly 96. The robot can then move the complete parts, those which passed the inspection, onto the outgoing trays 102 or 108 and place those which do not pass the inspection into the rejection drawer 110.

The robot 94 is programmed to place certain sample parts which have been completed and passed inspection into the SPC drawer 112. For example, every fiftieth part which has passed inspection may be moved into the SPC drawer 112 where it may be removed and externally inspected to ensure that the automation cell is meeting the required inspection standard.

In the embodiment illustrated in FIG. 9 or 10, the secondary operation assembly 96 is a roll checker. On the roll checker as shown in FIGS. 9-12, the part mounted on a spindle 314 is a gear 210. The roll checker has three locations for a master gear, as will be described in detail later. In other embodiments, the secondary operation assembly 96 may be related to composite inspection, profile inspection, pitch or index inspection, and the like. The gage is not limited to a roll checker and may include a contactless gage through vibration or vision. The roll checker may also be a simpler version as described for the first embodiment. In another embodiment, there may be more than one secondary operation assembly included in the automation cell 90. Element 97 represents a second secondary operation device. The second secondary operation device 97 may be another gauging station for gauging a second parameter of the manufactured part. The second secondary operation device 97 may also be a device other than the gauging station, the secondary operation device operable to perform a secondary operation other than gauging a parameter of the manufactured part.

The robot can be programmed to move a part from one secondary operation device to another secondary operation device or to move to only one of the secondary operation devices depending on the process requirements.

Figure 11:
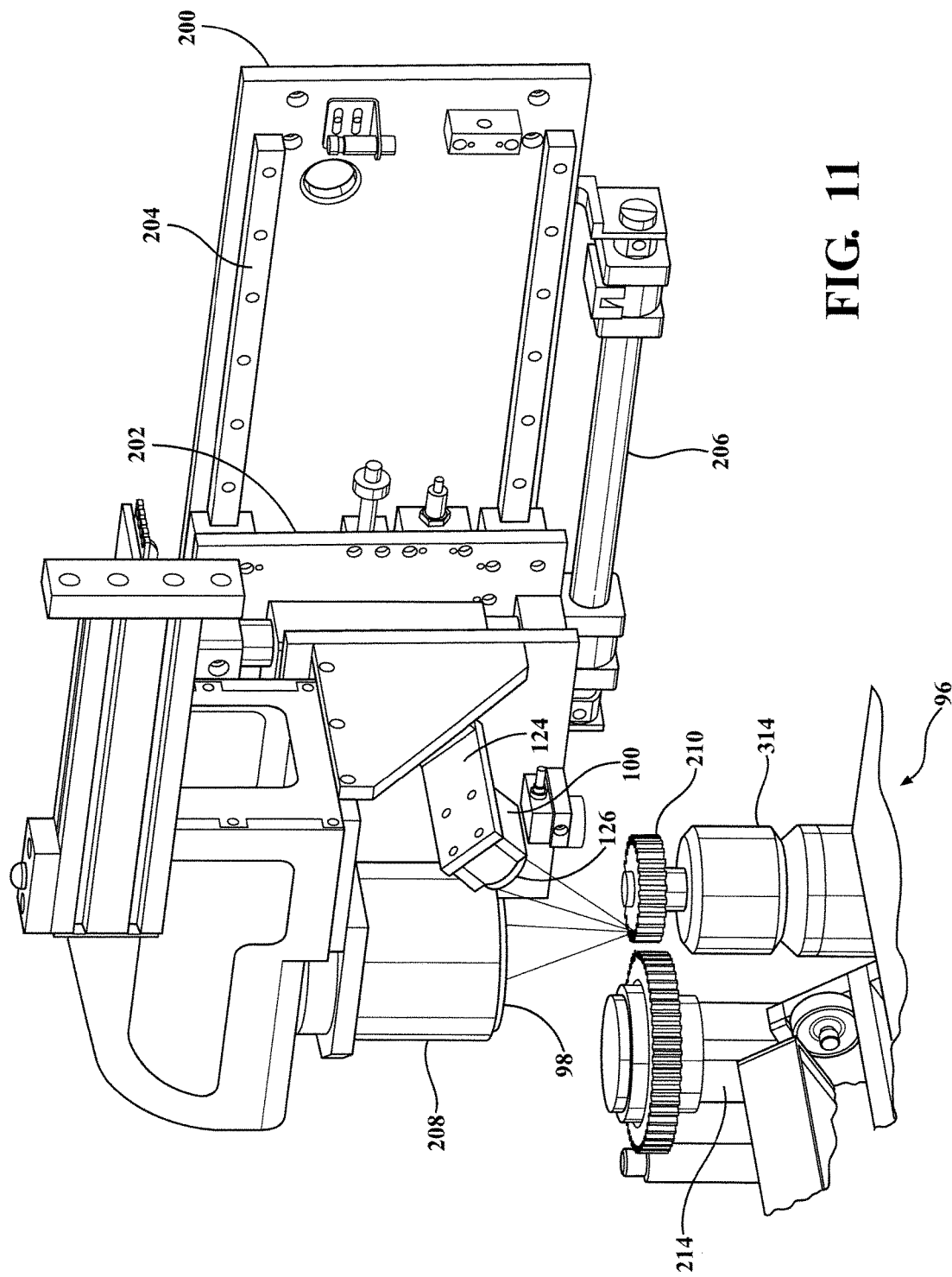
FIG. 11 is a perspective view of a section of the automation cell.
Figure 12:
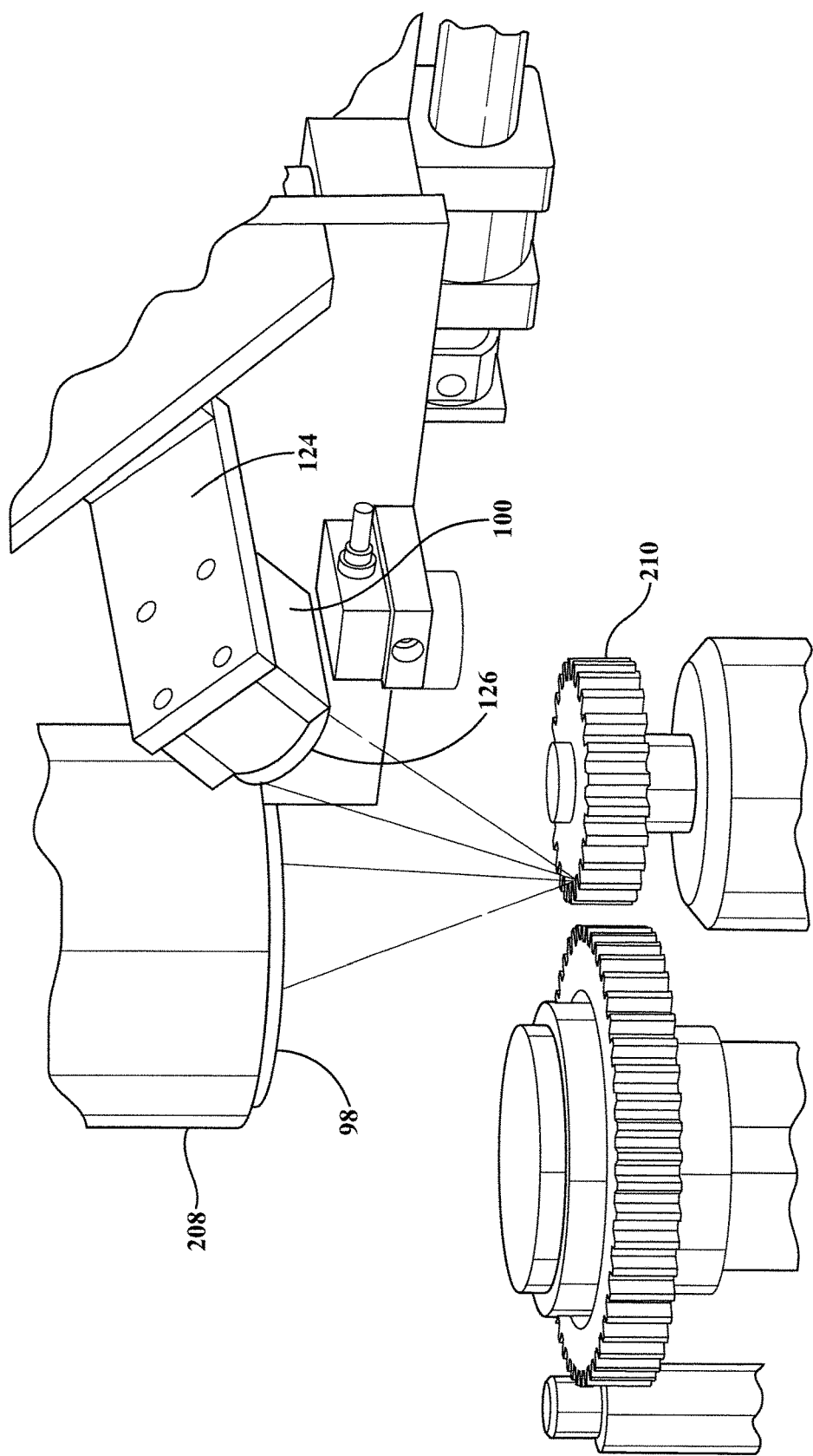
FIG. 12 is a close-up perspective view of a section of the automation cell.

In the embodiment illustrated in FIG. 9 or 10, the automation cell 90 further includes a laser marking device 98 and a vision system 100. The laser marking device 98 and a vision system 100 are mounted on a slide plate 202, as best shown in FIG. 11. A pair of linear rolls 204 extend parallel to one another on a base plate 200 and support the slide plate 202. A pneumatic cylinder 206 with adjustable pressure control drives the slide plate 202 toward the roll checker 96 so that the laser marking device 98 can perform laser marking on the gear mounted on the roll checker and the vision system 100 can verify the marking on the gear by the laser marker. The vision system includes an attachment plate 124 which can rotate about an axis perpendicular to the slide plate 202. The vision system typically includes a camera 126. The rotation of the camera can adjust the line of sight in accordance with the location of the laser marking.

The laser marker includes a laser shield 208, which moves downwardly and is used to cover the gear 210 during the laser marking. The laser marking step may be performed while the gear is clamped in the roll checker. The laser marking may also occur away from the roll checker, in a laser marking position, such as indicated at 209 in FIG. 9. If marking occurs away from the roll checker, the laser marking and vision systems would be moved to operate at the new position and the robot would move completed parts to the location 209.

In another embodiment, the automation cell may include a dot peening device for marking a manufactured part. Element 98 may represent the alternative dot peening device.

The manufactured part may include a gear, a shaft, a machined part, or a molded part. The part may be cylindrical or any other shape that may be suitable for the automation cell.

The automation cell 90 may include two robots. A second robot is represented in phantom lines at 95, and may take a variety of forms. One robot can be programmed to load and unload the parts between the machine center 92 and the cell 90. The other robot can be programmed to move the parts around within the cell such that all operations can be performed in a cycle time. Other approaches to work sharing may also be used.

Figure 13:
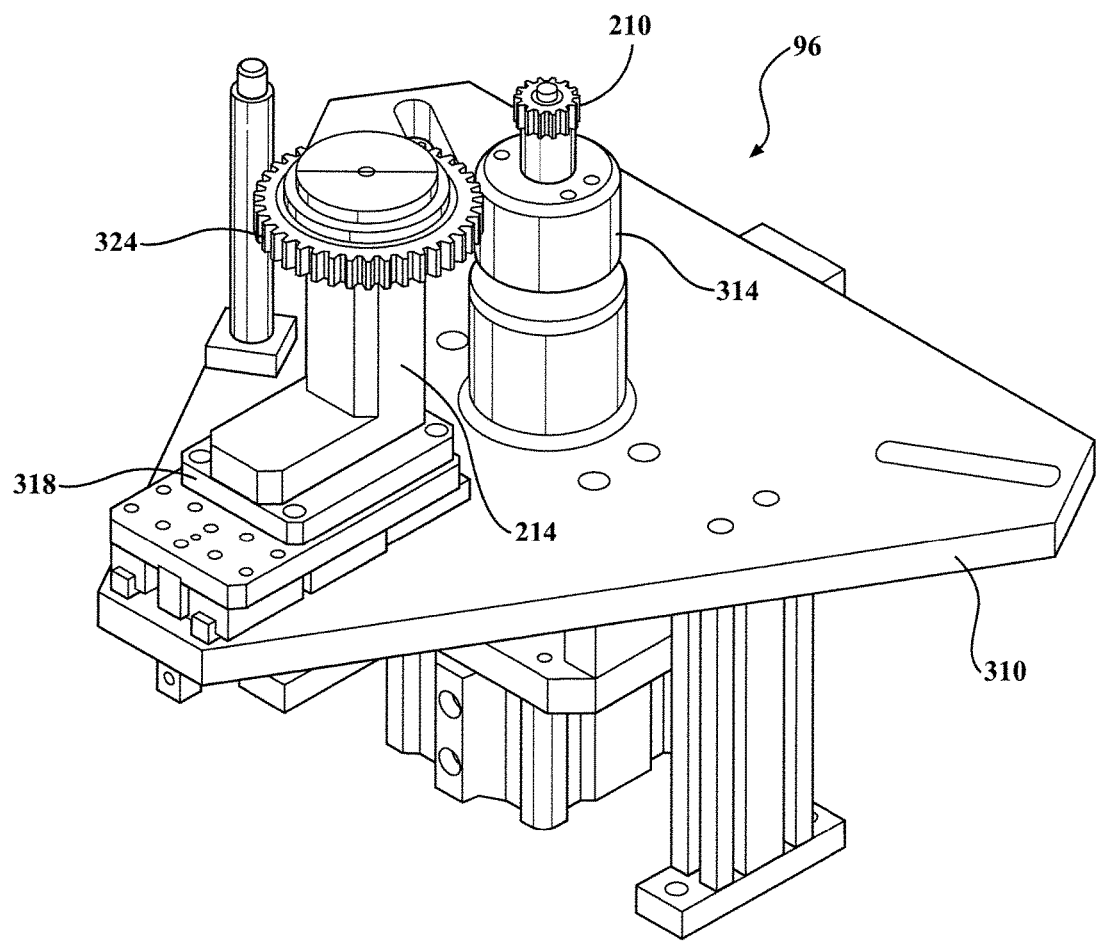
FIG. 13 is a perspective view of a run-out checking assembly used for checking a single gear.
Figure 14:
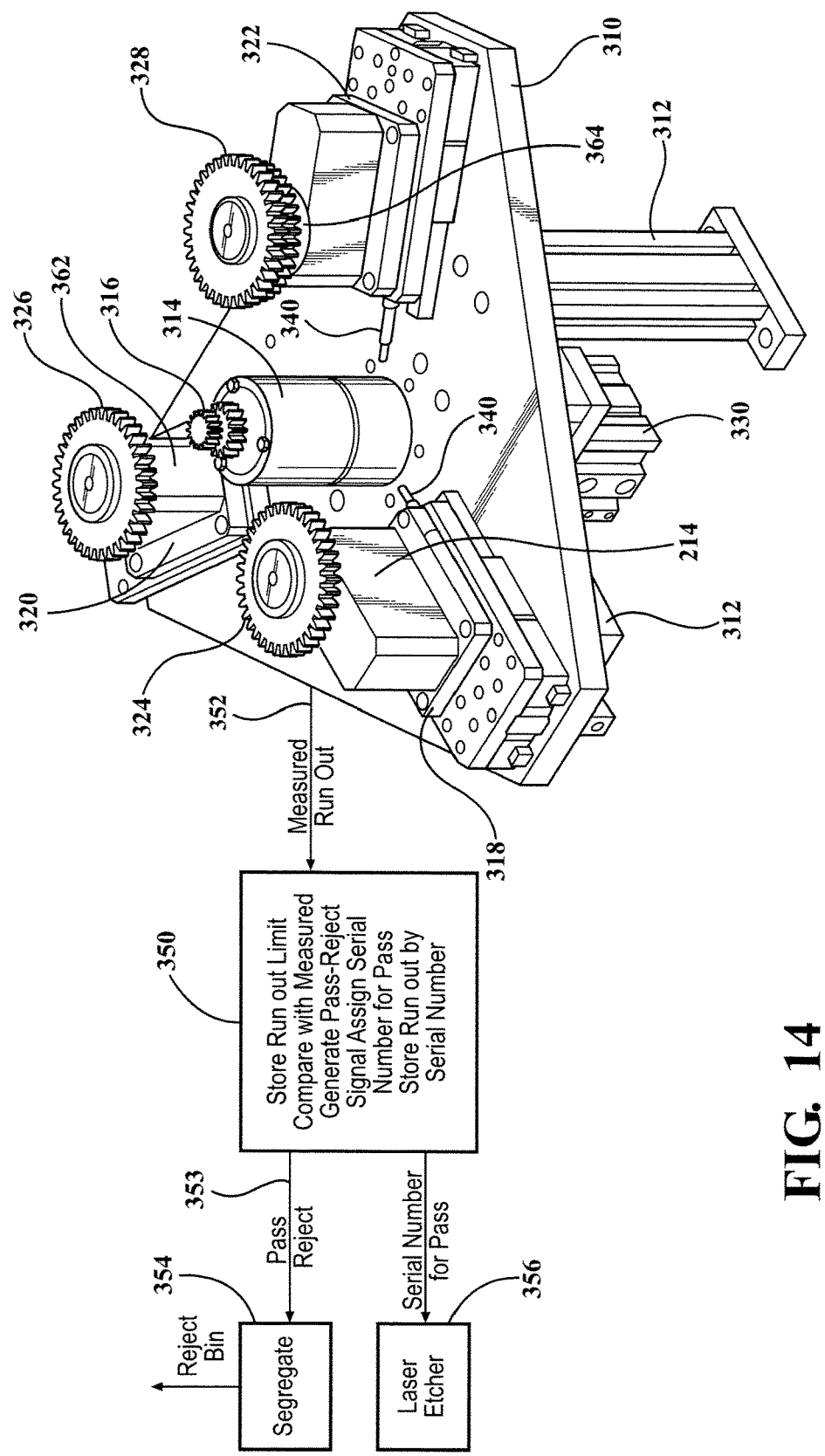
FIG. 14 is a perspective view of the run-out checking assembly for a cluster hear with two gears, and illustrating in block diagram a computer for receiving the measured run-out signals and an associated gear segregator and laser etcher.
Figure 15:
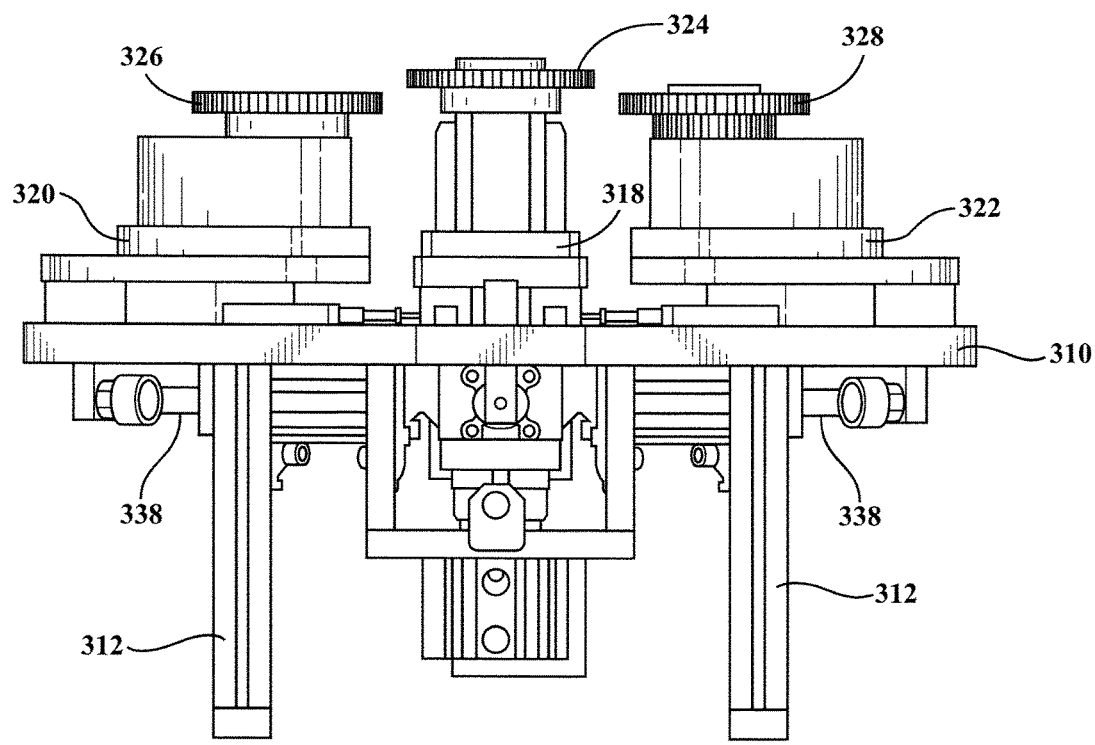
FIG. 15 is a front elevation view of the checking assembly of FIG. 14.
Figure 16:
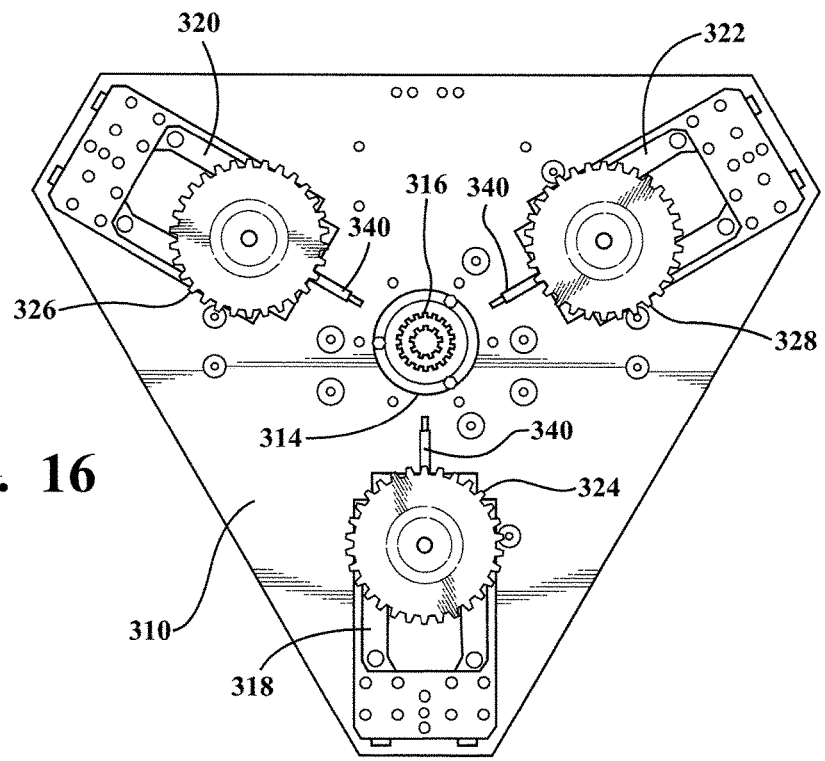
FIG. 16 is a top view of the checking assembly of FIG. 14.
Figure 17:
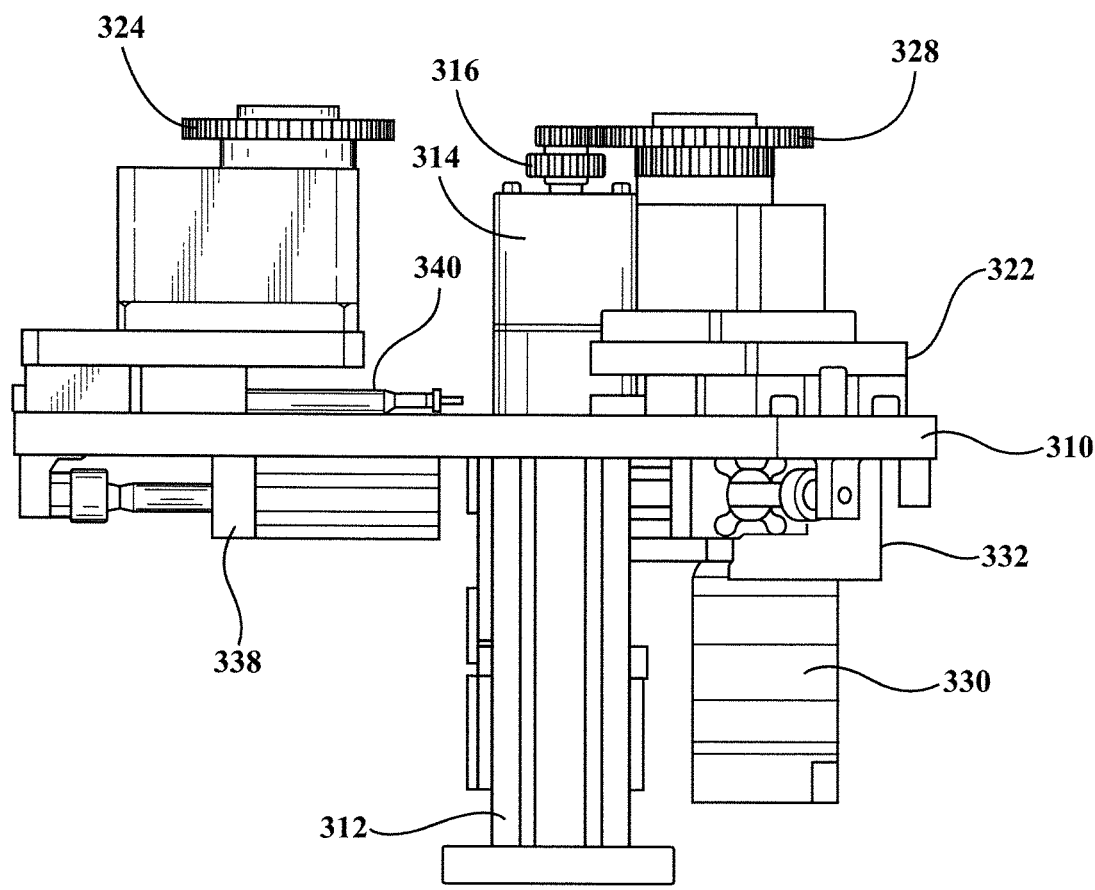
FIG. 17 is a side view of the checking assembly of FIG. 14.

The roll checker 96 will now be described in detail referring to FIGS. 13-17. The roll checker 96 is built around a base plate 310 which is supported and elevated above a suitable subassembly (not shown) by a pair of support legs 312. A spindle 314 for supporting a cluster gear 316 to be checked for run-out is supported on the center of the top side of the base plate 310. The spindle 314 is adaptable to various gears to be inspected. FIG. 13 shows when the roll checker is used to check a single gear. Only one master gear 324 is necessary.

The alternative embodiment of the roll checker 96 is for a cluster gear composed of two gears. The base plate 310 supports three master gear slides 318, 320, and 322. The slides 318 and 320 support master gears 324 and 326 which mate singly with the two gears of the cluster gear to be tested 316. The third slide 322 supports a dual master gear 328 which engages both of the two gears of the cluster 316 simultaneously to measure the run-out of both simultaneously.

During the run-out inspection the gear to be inspected is rotated through 360 degrees through an electric motor with a gear speed reducer 330 supported on a motor housing adapter 332 beneath the base plate 310.

Figure 4:
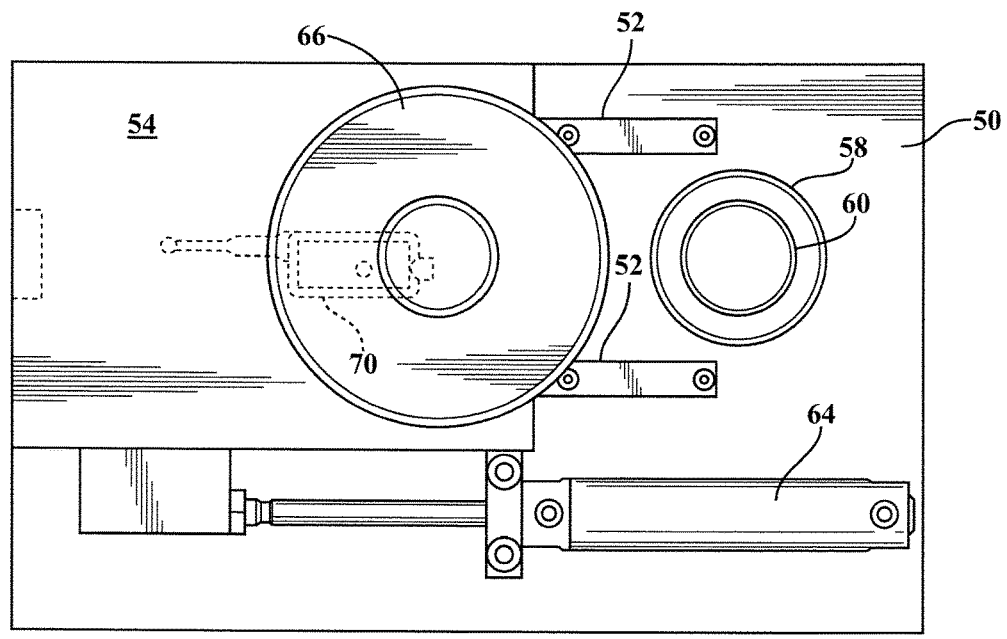
FIG. 4 is a plan view of the roll checking mechanism of the present invention.
Figure 5:
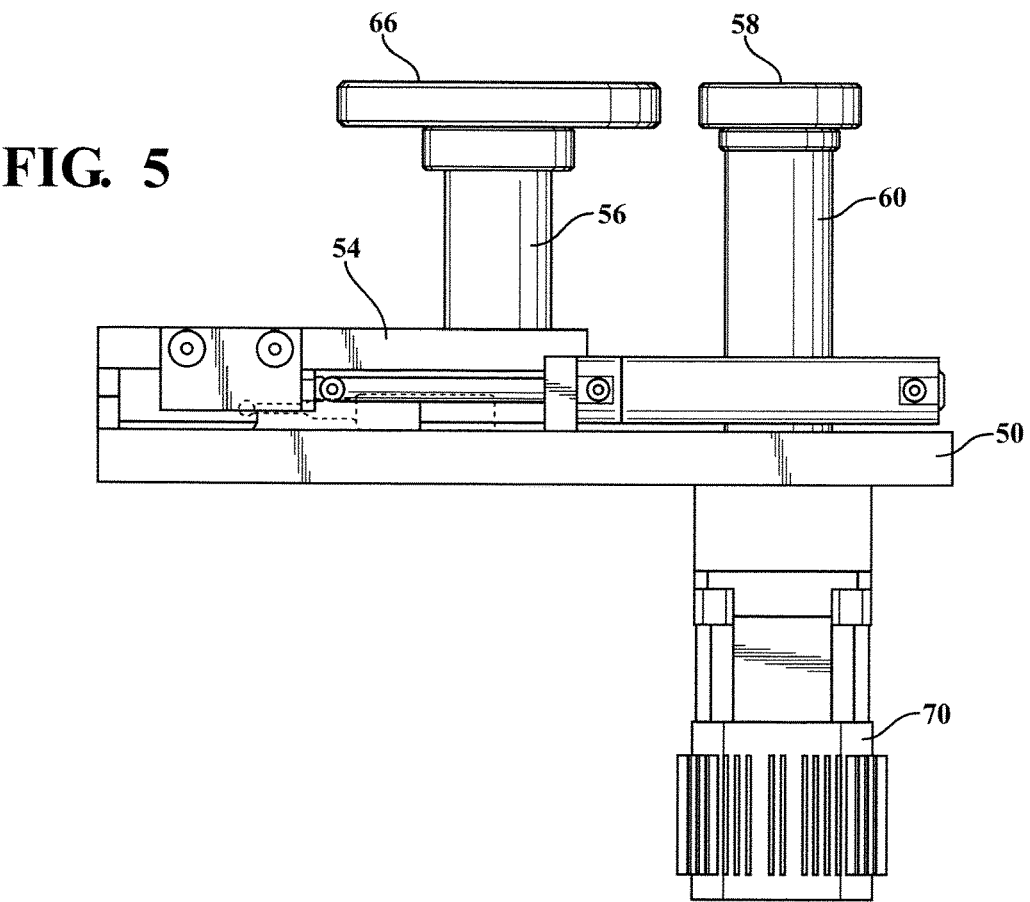
FIG. 5 is an elevation view of the roll checking mechanism of FIG. 4.
Figure 6:
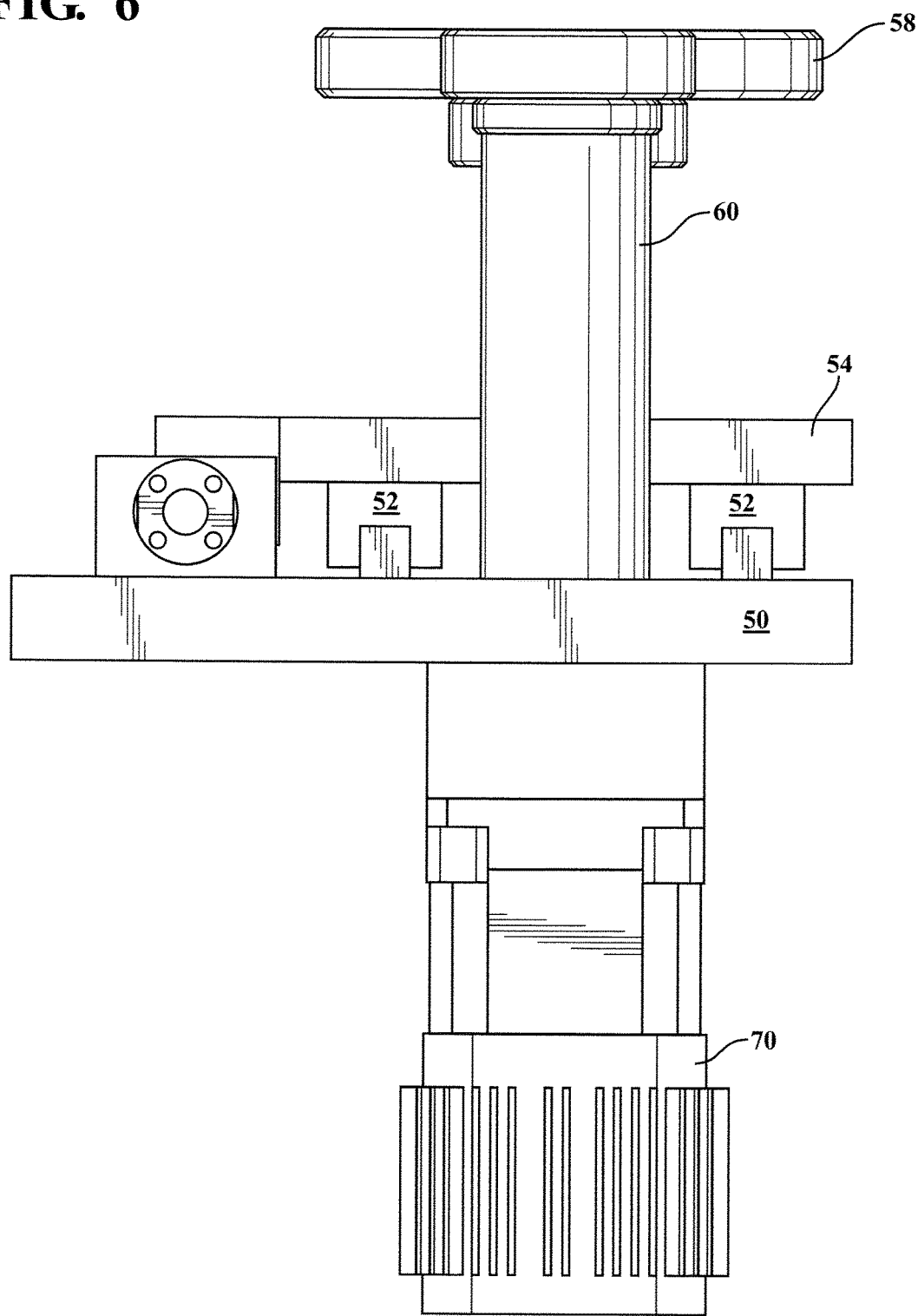
FIG. 6 is an end view of the roll checking mechanism of the present invention.
Figure 7:
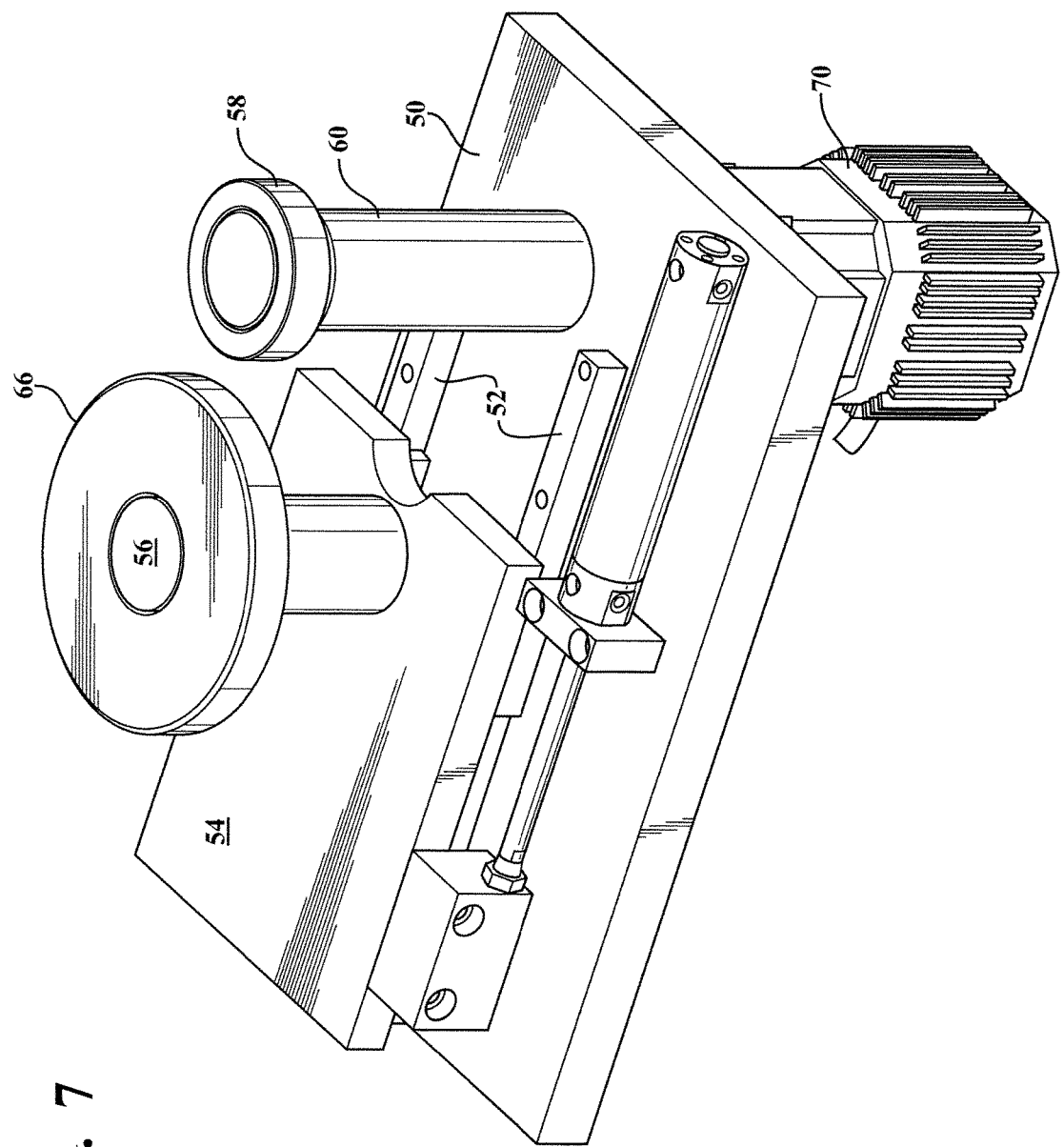
FIG. 7 is a perspective view from the upper side of the roll checking mechanism of the present invention.

The spindles for the master gears are each driven into and out of contact with the gear to be tested by pneumatic cylinders 338, one of which is illustrated in FIG. 4 as being located beneath the base plate 310.

The position of each of the slides is sensed by an LVDT 340 fixed on the base plate in a direction radial to the spindle 314 in the path of motion of its associated slide. The LVDT measures the motion of the slide relative to the spindle 314 while the cluster gear 316 to be measured is being rotated. These signals are sent to a computer 350 via a line 352.

The computer 350 stores the maximum run-out limit for each of the gears of the cluster 316. These values are compared with the measured run-out to generate a pass-reject signal. The pass-reject signal is sent to a mechanism 354 which divides the tested gears between a reject bin based on a control signal 352 and the cluster gears that pass the measurement test. The computer 350 assigns a serial number to each cluster gear that has passed inspection and feeds it to a laser etcher which marks the serial number on that gear. The computer also stores the runout information for each passed cluster gear along with the serial number for later reference. Alternatively, the laser etcher may mark the gear with other identifying information, either in addition to or instead of the serial number, such as a unique code or symbol, a pass/fail code, etc.

The sequence of operation of the roll check device for a single gear 210 is as follows:
1. Operator installs the appropriate master gear on the spindle 214 for the selected production part.
2. Operator installs the appropriate machined gear ID clamp mandrel on the spindle 314 for the selected production part.
3. The robot 94 places a machined gear onto the driven spindle 314.
4. The driven spindle ID clamp will actuate, clamping the part on the ID (internal diameter).
5. The slide 318 then is actuated forward by the pneumatic cylinder 338 to engage the machined gear with the master gear.
6. The machined gear then starts to rotate. During initial rotation, the LVDT 340 is monitoring the linear position of the slide table to first ensure the production and master gears have meshed. Once the mesh is realized, the production gear will now monitor the rotation to ensure 1.5 revolutions of the production piece while the LVDT is monitoring the slide table position for gear run-out.
7. Once the inspection cycle is complete, the slide table retracts back to the load/unload position and the driven spindle unclamps the ID part clamp of the production piece.
8. Now the cycle is complete and the robot 94 is clear to remove the machined gear, move the machined gear to the outgoing trays 108 and grip the next one from the incoming trays 104, load onto the driven spindle 314, re-starting the cycle again at step 3.

The sequence of operation of the roll check device for a cluster gear 316 composed of two gears using a dual master gear is similar to the sequence of operation of the roll check device for a single gear.

The sequence of operation of the roll check device for a cluster gear 316 composed of two gears using two master gears is as follows:
1. Operator installs the appropriate master gears 324 and 326 on the spindle 214 and 362 respectively, for the selected production part.
2. Operator installs the appropriate machined gear ID clamp mandrel on the spindle 314 for the selected production part.
3. The robot 94 places a machined cluster gear 316 onto the driven spindle 314.
4. The driven spindle ID clamp will actuate, clamping the part on the ID (internal diameter).
5. The slides 318 and 320 then are each actuated by the pneumatic cylinders 338 to drive the two master gears forward to engage singly two gears of the machined cluster gear.
6. The machined cluster gear then starts to rotate. During initial rotation, the LVDT 340 is monitoring the linear position of the slide table to first ensure the production and master gears have meshed. Once the mesh is realized, the production gear will now monitor the rotation to ensure 1.5 revolutions of the production piece while the LVDT is monitoring the slide table position for gear run-out.
7. Once the inspection cycle is complete, the slides retracts back to the load/unload position and the driven spindle unclamps the ID part clamp of the production piece.
8. Now the cycle is complete and the robot 94 is clear to remove the machined cluster gear, move the machined cluster gear to the outgoing trays 108 and grip the next one from the incoming trays 104, load onto the driven spindle 314, re-starting the cycle again at step 3.

The sequence of operation of the entire system is as follows assuming the robot 94 includes two grippers A and B, similar to the robot aim shown in FIG. 8:
1. Operator loads a full tray of "Green" part blanks in the incoming part tray 104, and an empty tray 108 at the outgoing part tray position.
2. Operator closes the access door and presses a start button.
3. The robot 94 travels to the incoming tray position and removes a green part with the gripper A.
4. The robot then travels to the grinding machine and removes a finished part with gripper B, and places a green part with gripper A and moves out clear of the machine (at this point the machine starts its cycle).
5. The robot travels to the part wash position (not shown, but may be similar to the first embodiment) and removes a finished/washed part with gripper A, and places the finished/dirty part in the washer with gripper B and moves up clear of the washer (at this point the washer starts its cycle).
6. The robot travels to the roll checker 96 and removes a fully inspected part from the checker fixture with gripper B, and places the cleaned finished part in the checker fixture with gripper A and moves clear of the roll checker (at this point the roll checker starts its cycle).
7a. The robot 94 travels to the laser marker 98 and removes a marked part with gripper A, and places the inspected part in the laser marker fixture with gripper B and moves up clear of the shuttle fixture (at this point the laser marker fixture moves into the laser marking position 209 for marking the part).

7b. Once the part is marked by the laser, the vision system 100 will move into the vision verifying position and verify the mark of the part.

7c. If the inspected part does not pass the roll check, the robot will move to the reject bin and deposit the part.

8. The robot travels to the outgoing tray position 108 and places the machined, washed, inspected and laser marked and vision verified part into the outgoing part tray.

9. Cycle now starts over at sequence number 3.

As will be clear to those of skill in the art, the herein described embodiments of the present invention may be altered in various ways without departing from the scope or teaching of the present invention. As one non-limiting example, any feature or element of either embodiment may be used with the other embodiment, as needed to suit a particular application. It is the following claims, including all equivalents, which define the scope of the invention. As a further non-limiting example, the parts washer of the first embodiment is included in certain versions of the second embodiment.

Having thus disclosed our invention, we claim:

1. A method of performing a plurality of secondary operations on manufactured parts for use with a manufacturing machine operable to perform primary manufacturing of the parts, the method comprising:
   providing an automation cell having:
      a cell housing;
      a robot supported in the housing and having an elongated arm with a gripper mechanism disposed on the elongated arm;
      a gauging station supported in the housing, the gauging station operable to gauge a parameter of a manufactured part; and
      a marking device supported in the housing;
      a vision system supported in the housing;
   positioning the cell housing adjacent to the manufacturing machine to allow the robot arm to move a green part or a manufactured part between the cell housing and the manufacturing machine;
   retrieving the manufactured part from the manufacturing machine using the gripper mechanism of the robot;
   positioning the manufactured part in the gauging station;
   performing a gauging operation on the manufactured part within the cell housing and determining if the manufactured part meets a specification;
   marking the manufactured part within the cell housing using the marking device if the manufactured part meets the specification, the marking being an identification code; and
   using the vision system to verify the marking within the cell housing.

2. The method of claim 1, wherein the gauging station is selected from a roll checker and a vision system.

3. The method of claim 1, wherein the manufactured part is selected from a machined gear, a machined shaft, a machined part and a molded part.

4. The method of claim 1, wherein the marking device is selected from a laser marking device and a dot-peening device.

5. The method of claim 1, wherein the marking step is performed while the manufactured part is clamped in the gauging station.

6. The method of claim 1, wherein the automation cell further includes:
   an input area and an output area defined at least partially in the cell housing; and
   a plurality of part holding trays disposed in the input and output area.

7. The method of claim 6, the method further comprising:
   gripping a part from one of the part holding trays in the input area using the gripper mechanism of the robot and moving it to the manufacturing machine; and
   gripping the manufactured part after the vision verifying step using the gripper mechanism of the robot and moving it to one of the part holding trays in the output area.

8. The method of claim 1, wherein the automation cell further includes a second robot.

9. The method of claim 1, wherein the identification code is used for the traceability of the manufactured part.

10. The method of claim 1, wherein the automation cell further includes a second gauging station supported in the housing, the second gauging station operable to gauge a second parameter of the manufactured part.

11. The method of claim 1, wherein the automation cell further includes a secondary operation device other than the gauging station, the secondary operation device operable to perform a secondary operation other than gauging a parameter of the manufactured part.

* * * * *